United States Patent [19]
Prechter et al.

[11] 3,964,784
[45] June 22, 1976

[54] SLIDING ROOF CONSTRUCTION

[75] Inventors: Heinz C. Prechter, Grosse Ile; Milton C. Kaltz, Allen Park, both of Mich.

[73] Assignee: American Sun Roof Corporation, Southgate, Mich.

[22] Filed: July 11, 1974

[21] Appl. No.: 487,593

[52] U.S. Cl. .............................. 296/137 E; 49/372; 296/137 G
[51] Int. Cl.² ............................................ B60J 7/00
[58] Field of Search ......... 296/137 E, 137 F, 137 G, 296/137 H, 137 B, 137 A, 95 R; 49/372, 409, 459, 419; 16/93 R

[56] References Cited
UNITED STATES PATENTS

| | | | |
|---|---|---|---|
| 2,193,607 | 3/1940 | Votypka | 296/137 F |
| 2,203,931 | 6/1940 | Solomon et al. | 296/137 F |
| 2,968,514 | 1/1961 | Golde | 296/137 F |
| 3,033,608 | 5/1962 | Golde | 296/137 E |
| 3,078,122 | 2/1963 | Werner | 296/137 E |
| 3,081,852 | 3/1963 | Mendelsohn | 49/459 |
| 3,279,845 | 10/1966 | Lutz | 296/95 R |
| 3,558,183 | 1/1971 | Sigmund | 16/93 R |

*Primary Examiner*—Albert J. Makay
*Attorney, Agent, or Firm*—Everett R. Casey; Joseph R. Papp

[57] ABSTRACT

A sliding roof construction for an automotive vehicle including a sliding glass roof assembly and a sliding screen assembly with the screen assembly including a screen having a temperature stable construction and with the glass roof assembly having an improved guide and track construction and improved rear support construction whereby higher vehicle impact loads can be encountered without failure and having an improved glass retaining structure.

10 Claims, 10 Drawing Figures

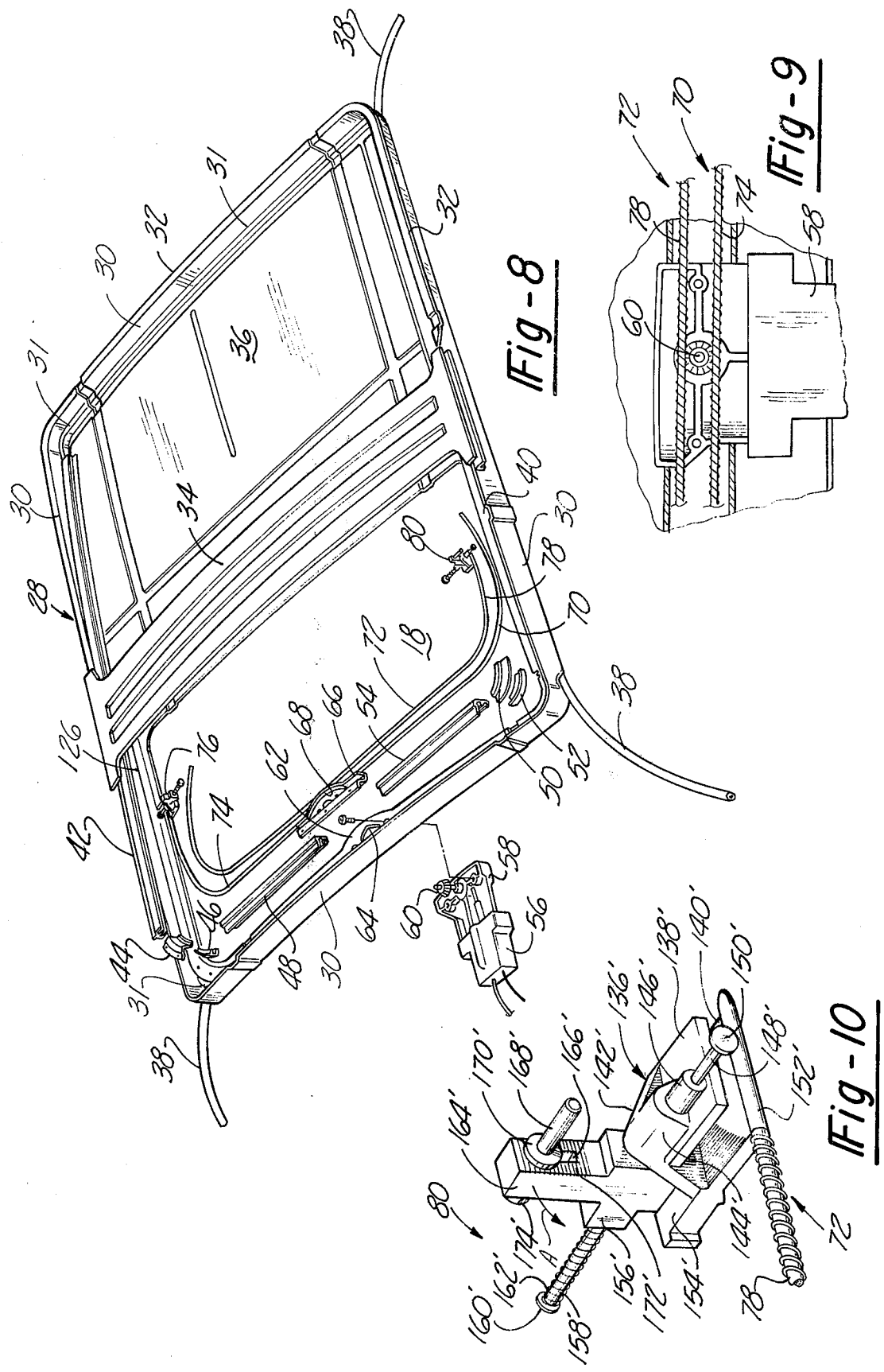

SLIDING ROOF CONSTRUCTION

SUMMARY BACKGROUND OF THE INVENTION

The present invention relates to sliding roof construction and more particularly to a construction including a sliding glass roof assembly and a separate sliding screen assembly.

In the present invention a sliding screen assembly has been provided including a screen having good temperature stability characteristics such that heat distortion such as warping, etc., is minimized. Further with regard to the glass roof assembly the strength of the guide and track construction has been improved and the strength of the rear support has been improved whereby higher vehicle impact loads can be encountered without failure. In addition an improved glass retaining structure is provided reducing glass breakage during assembly.

Therefore, it is an object of the present invention to provide an improved sliding screen assembly having a screen with improved temperature stability.

It is an object to provide an improved glass retaining structure for a sliding glass roof assembly.

It is another object of the present invention to provide an improved sliding glass roof assembly having an improved guide and track construction and improved rear support construction.

It is a general object to provide an improved sliding screen assembly.

It is another general object to provide an improved sliding glass roof construction.

It is still another general object of the present invention to provide an improved sliding roof construction.

Other objects, features, and advantages of the present invention will become apparent from the subsequent description and the appended claims, taken in conjunction with the accompanying drawings, in which:

FIG. 8 is a partially exploded, pictorial view of the frame and related components (less the glass roof and screen assemblies);

FIG. 9 is a top elevational view to enlarged scale depicting the drive cables in driving engagement with the drive gear; and FIG. 10 is a pictorial view, to enlarged scale, of the opposite rear guide similar to that shown in FIG. 4.

Figure 1:
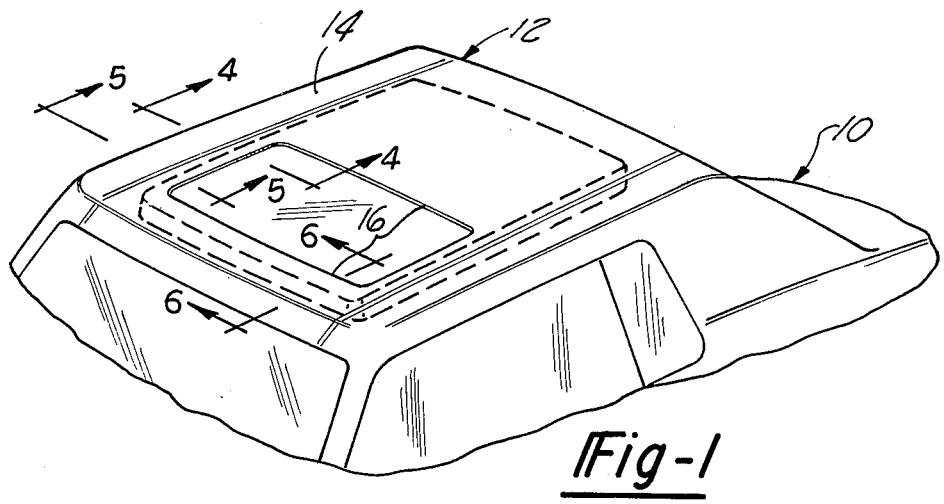
FIG. 1 is a pictorial view of a portion of a vehicle including the sliding roof construction of the present invention.
Figure 2:
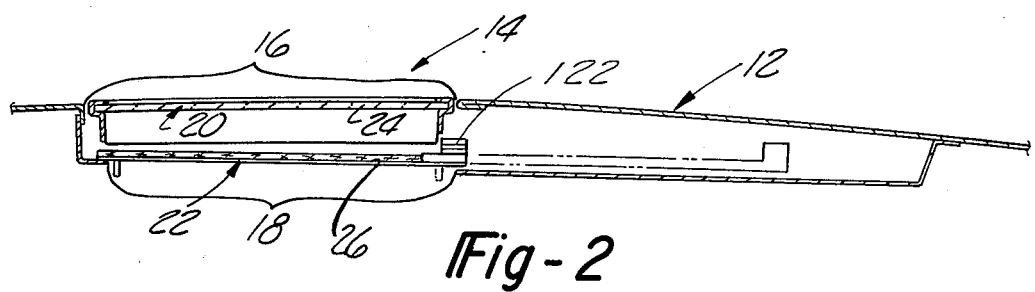
FIG. 2 is a sectional view, in schematic form, showing the sliding roof construction in one condition.
Figure 3:
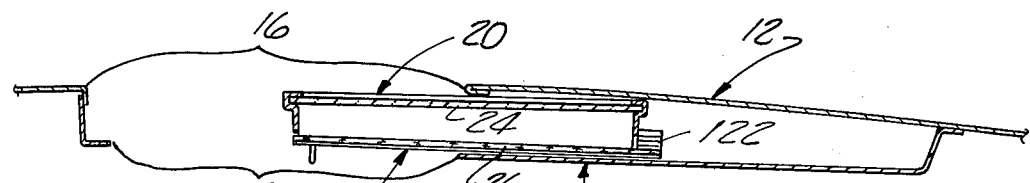
FIG. 3 is a sectional view, in schematic form, showing the sliding roof construction in a partially open condition.

Looking now to FIG. 1, a vehicle 10 (partially shown) is depicted with a roof 12 having a sliding roof assembly 14 shown in assembled relationship therewith. Looking now to FIGS. 2 and 3 the roof 12 is provided with an opening 16 with the sliding roof assembly 14 secured to the inside of the roof 12 and itself having an opening 18 which is located in alignment with roof opening 16. Assembly 14 includes a sliding glass roof assembly 20 and a sliding screen assembly 22. The glass roof assembly 20 includes a glass panel 24. The glass panel 24 preferably is of a one-way mirror type construction which permits the occupant to see out while precluding one outside the vehicle from looking in. The screen assembly 22 is located beneath the glass roof assembly 20 and includes an opague screen 26 which blocks light. The combination thus far described has a number of usable modes. As shown in FIG. 2, the screen assembly 22 and glass roof assembly 20 are in their fully closed positions whereby the opaque screen 26 blocks light (and heat) from the vehicle interior and also precludes the occupant from looking out. The screen assembly 22 can be moved back, independently of the glass roof assembly 20, and hence permit the occupant to see out, through the glass panel 24. In FIG. 3, the screen assembly 22 and glass roof assembly 20 are both being moved rearwardly out of the openings 16 and 18, thereby opening the interior to the outside.

The sliding roof assembly 14 includes a generally rectangular frame 28. The frame 28 is defined by an outer or peripheral channel 30 the rearward half of which has an outer extending flange 32. A reinforcing plate 34 extends transversely across opposite side channels 30. A lower plate portion 36 covers the lower, rearward portion of the frame 28 and generally defines at its forward end the opening 18. The inner periphery of the channel 30 defines a gutter 31 (see FIGS. 4, 5, 6 and 8) which communicates at each corner with drain tubes 38. The frame 28 is a one piece stamping (excluding the reinforcing plate 34) with the channel 30 being of sufficient depth to accomodate both the glass roof assembly 20 and the screen assembly 22.

Side cable guides and tracks 40 and 42 (see FIG. 8) are located on opposite sides of the frame 28 (the left hand guide and track 42 is shown disassembled from the frame 28). Curved guide sections 44 and 46 are located in the front left corner of frame 28 and cooperate with the guide portion of guide and track 42 and with a straight front guide section 48. In a similar manner, curved guide sections 50 and 52 are located in the front right corner of frame 28 and cooperate with the guide portion of guide and track 42 and with a straight front guide section 54. The operation of the guide portions and sections will better be understood from discussions which follow.

An electric drive motor 56 has its output connected to a gear assembly 58 which terminates in a bevel gear 60. The motor 56 and gear assembly 58 are connected to the front end of the frame 28 at an extended lip portion 62 which has an opening 64 which receives the drive gear 60. A center guide 66 fits onto the lip 62 over the opening 64 and has an enlarged channel 68 which receives the drive gear 60.

As will be seen, the glass roof assembly 20 is driven by the motor 56 and gear assembly 58 via drive cable assemblies 70 and 72. The cable assembly 70 includes a drive cable 74 and rear support 76 while the cable assembly 72 includes a drive cable 78 and rear support 80 (see FIGS. 8-10). The cables 74 and 78 have a helically wound structure on their outer surfaces adapted to engage the drive gear 60. As the drive gear 60 is rotated the cables 74 and 78 are more in translation and, as will be seen, can move the glass roof assembly 20 linearly to its open or closed position. The motor 56 is reversible and can be actuated to open or retract the assembly 20 via a suitable switch (not shown). Let us next look to the construction and operation of the glass roof assembly 20 and the screen assembly 22.

As will be seen, the glass roof assembly 20 is actuated via the electric motor 56 while the screen assembly 22 is manually actuated. Both assemblies are shown in exploded view in FIG. 7.

The glass roof assembly 20 includes the glass panel 24. The panel 24 is rectangularly shaped and is adapted to fit within a groove 82 in a split molding 84. The molding 84 is made of a deformable material such as a mild aluminum in order to permit the molding to be deformed as needed in assembly of the glass panel 24 without unduly stressing the glass. In this regard the use of a split molding instead of a continuous, nonsplit molding assists assembly while minimizing stress on the glass. A suitable adhesive is applied in the groove 82 to provide a good connection between the glass panel 24 and molding 84. The molding 84 provides a means of mechanically securing the glass panel 24 to the remainder of the assembly 20 and to this end is provided with a depending peripheral leg 86. The leg 86 extends around the periphery of a raised portion 88 of a reinforcing member 90. The raised portion 88 is generally rectangularly shaped and extends about an opening 92. The glass panel 24 is supported on the raised portion 88 (see FIG. 4) and the subassembly of the glass panel 24 and molding 84 is secured to the reinforcing member 90 via fasteners such as fastener 94 shown in FIG. 4. Thus the glass panel 24 is supported by the molding 84 via the groove 82 and adhesive bond and further via the attachment to the reinforcing member 90. Since the molding 84 is made of a deformable aluminum the attachment to the glass panel 24 and to the reinforcing member 90 can be made without undue stress on the glass panel 24.

The reinforcing member 90 is provided with a pair of dimpled portions 94 located at the opposite, forward corners of the raised portion 88. Dimpled portions 96 are located at opposite rearward corners of the raised portion 88 and additional dimpled portions 98 are located at opposite sides near the rearward corners of the raised portion 88. The dimpled portions 94, 96 and 98 are provided to permit the location of fasteners therein below the plane of the glass panel 24. A pair of front support assemblies 100 are secured to the dimples 94 and provide front support for the glass roof assembly 20 in a manner to be seen. A pair of leaf springs 102 are secured to dimples 98 while a pair of pin supports 104 are secured to dimples 96. The leaf springs 102 and pin supports 104 cooperate with left and right hand rear supports 76 and 80 to provide rear support for the glass roof assembly 20 in a manner to be seen. The front support assembly 100 includes a bifurcated channel 106; a stud 108 is fixed to the dimple 94 while a threaded adjustment ring 110 is threaded onto the stud 108. Fasteners 112 connect channel 106 to stud 108 with the ring 110 determining the final positional location of the channel 106. Thus the position of channel 106 (and hence vertical position of the glass roof assembly 20) can be selectively varied via ring 110. A U-shaped plastic insert 113, is made of a plastic material having good lubricity characteristics is located at the bifurcated end of the channel 106 and facilitates sliding on an associated track to be described.

A rectangularly shaped decorative bezel or panel 114 interfits with the raised portion of reinforcement member 90 and can be secured thereto by suitable fasteners to provide an attractive interior finish when exposed to view. The bezel 114 has side flanges 115 which are covered by a decorative covering 117.

Figure 7:
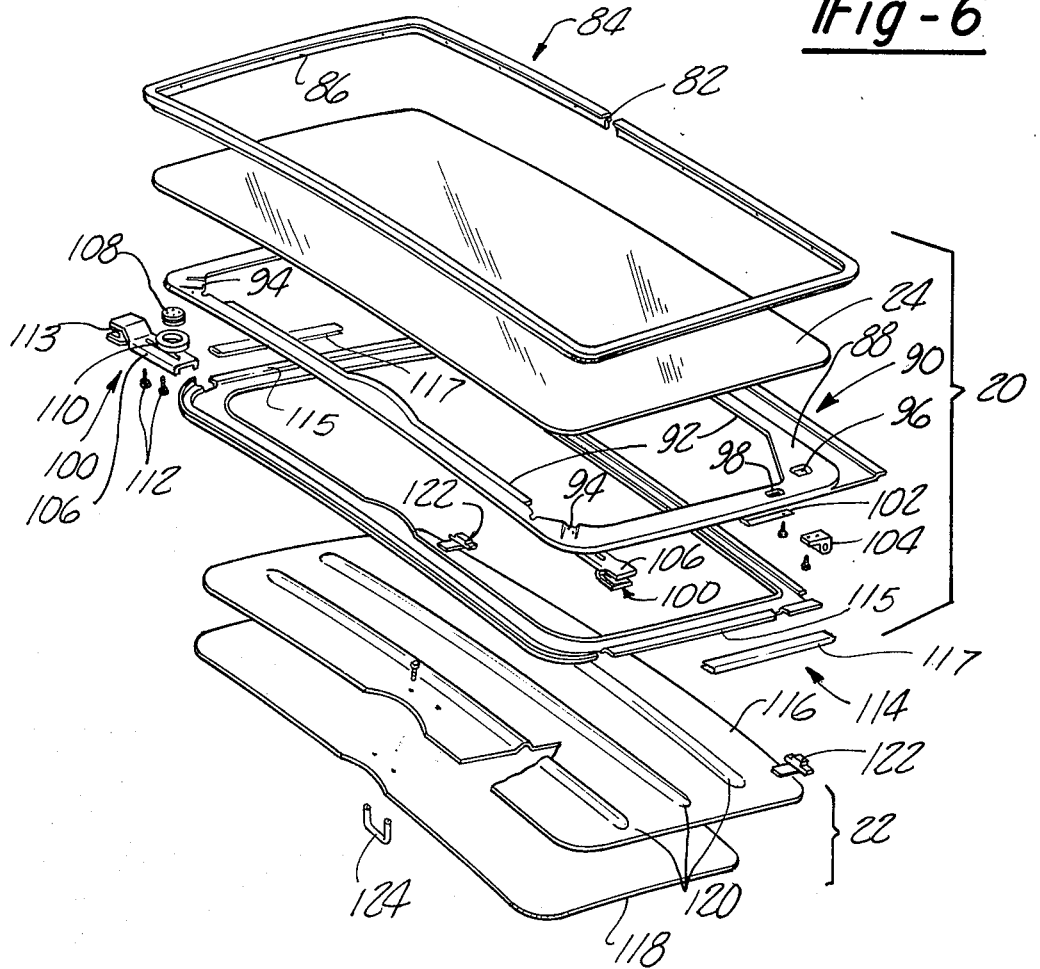
FIG. 7 is an exploded pictorial view of the glass roof and screen assemblies.

The screen assembly 22 (which cooperates with the glass roof assembly 20) is shown in an exploded pictorial view in FIG. 7 and comprises a generally flat rectangular ribbed panel 116 and a flat covering 118. The panel 116 has a plurality of longitudinally extending ribs 120 which are formed in the panel 116. The covering 118 is secured, via a suitable adhesive, to the side of panel 116 at which ribs 120 are open. The panel 116 is made of a temperature stable material such that it will not deform, etc., from the heat of the sun; in a preferred form of the invention the panel 116 is made of hardboard. The covering 118 is made of a stiff paper like material. When secured to the panel 116, the covering 118 closes the ribs 120 and adds to the rigidity of the combination; in addition the covering 118 presents a smooth, uniform surface which facilitates finishing with suitable headliner material. A pair of catch brackets 122 are located at opposite ends at the rear of the panel 116 and functions to provide opening of the screen assembly 22 via the glass roof assembly 20 in a manner to be seen. A handle 124 is secured to the front of the screen assembly 22 for manual operation thereof.

Figure 4:
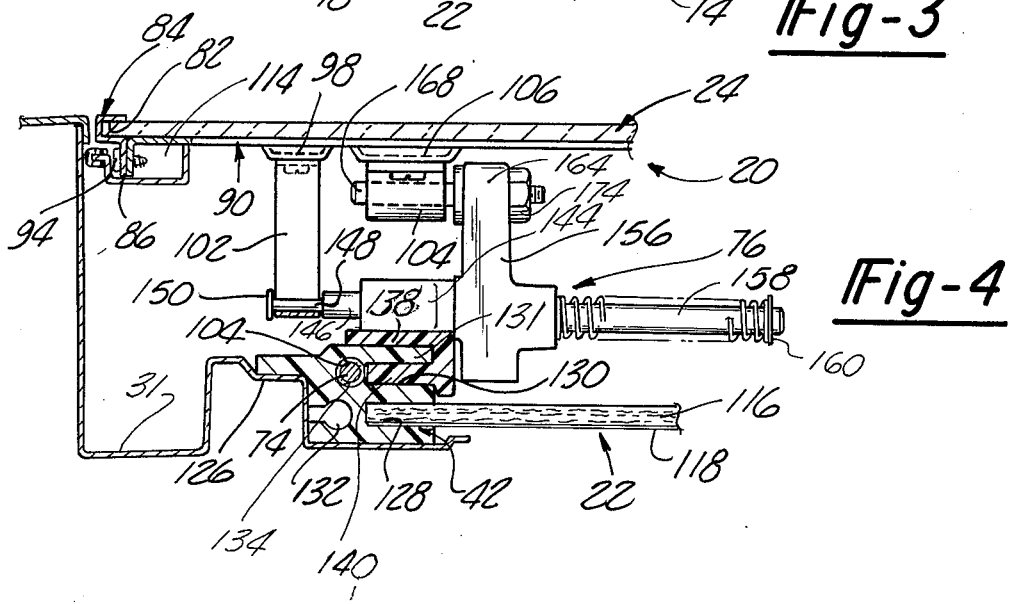
FIG. 4 is a sectional view, to enlarged scale, taken substantially along the line 4—4 in FIG. 1 depicting the rear guide in one position with the side cable guide and track.
Figure 5:
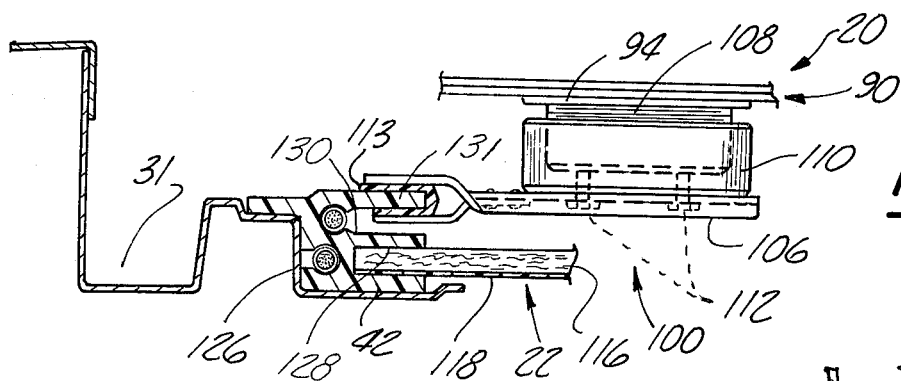
FIG. 5 is a sectional view, to enlarged scale, taken substantially along the line 5—5 in FIG. 1 depicting the front guide in one position with the side cable guide and track.
Figure 6:
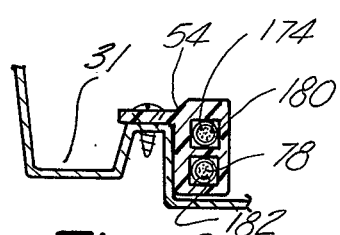
FIG. 6 is a sectional view to enlarged scale, taken substantially along the line 6—6 in FIG. 1 depicting a portion of the front cable guide.

Looking now to FIGS. 4 and 5 the frame 28 has side ledges 126 extending from opposite sides from gutter 31 which support side cable guides and tracks 40 and 42 (cable guide and track 42 is shown in assembled relation to ledge 126; cable guide and track 40 on the opposite side is identically situated relative to the ledge 126 at that opposite side). The guide and track 42 is a longitudinally extending bar structure having a pair of longitudinal, vertically displaced slots 128 and 130 with slot 130 defining an upper track 131. Generally in line with slots 128 and 130 are longitudinally extending, generally circular openings 132 and 134, respectively. The lower opening 132 is slotted outwardly away from its aligned slot 128 while the upper opening 134 is in open communication with slot 130. The opposite edges of screen assembly 22 are located in lower slots 128 in opposite guides and tracks 40 and 42 and can slide therein between its open the closed positions. The glass roof assembly 20 is moved via the front support assemblies 100 and the rear supports 76 and 80 (left and right). The front support assemblies 100 engage and slide on track 131 via the plastic insert 113 in bifurcated channel 106.

Since the right support 80 is the mirror image of the left support 76 the same numbers are applied to similar parts with the parts for the right support 80 being given primed numbers. In FIG. 4 the left support 76 is shown in assembly relationship with the glass roof assembly 20 and the side guide and track 42. In FIG. 10 the right support 80 is shown in pictorial view out of assembly relationship. Let us look first to the right support 80 in FIG. 10.

The right support 80 has a one piece slide body 136' which has upper and lower, flat, vertically spaced slide plates 138' and 140', respectively, which are integral with a generally triangulated support portion 142'. A boss 144' extends from the apex of the support portion 142' and acts as a reinforcing rib for upper slide plate 138'. An elongated pin 146' extends through both sides of boss 144 and has a reduced diameter portion 148' which terminates in a head 150'. The terminating end of associated drive cable 78 is captured and held by a sleeve portion 152' which is at the end of the lower slide plate 140'. In the past rear supports such as support 80 have been made of a zinc die casting and a plastic insert having good lubricity characteristics has been located between the upper and lower slide plates. This provides a restriction on the available cross section at the juncture between the sleeve 152' and lower plate 140'. In the present invention the slide body 136' is made of a one piece molded part of a plastic having good lubricity characteristics. In a preferred form the slide body 136' is of a polycarbonate. With the elimination of the need for plastic inserts the section of the slide plates 138' and 140' can be increased, increasing their overall strength and in addition increasing the strength of the area between lower slide plate 140' and sleeve 152'. A stop block 154' extends rearwardly from the triangular support portion 142'. A support block 156' is pivotally supported at the rearward face of support portion 142' via the rearward portion 158' of pin 146' which has a snap ring 160' at its outer end. A spring 162' is in precompression between the ring 160' and support block 156' to urge the block 156' into engagement with the rear face of the support portion 142'. The stop block 154' is in a position to engage the support block 156' and prevent it from rotating in one direction; the support block 156', however, is free to rotate or pivot in the opposite direction (as shown in the direction of arrow A in FIG. 10). The support block 156' is generally rectangularly shaped and, as assembled, extends above slide body 136' with a sloted portion 164'. A vertical slot 166' receives one end of a support pin 168'. The pin 168' has an intermediate flange or washer 170' adapted to engage the serrated outer face 172' on sloted portion 164' and has a threaded portion extending through the slot for engagement by a nut 174'. The height of the support pin 168' can be selectively varied via the slot 166'; the rearward face of washer 170' is serrated to provide engagement with serrations 172'; in this way the vertical position of the support pin 168' will be more positively retained. With the structure of the rear support 80 thus described let us now look to the assembled relationship of its counterpart rear support 76 in which similar components have been given the same unprimed numbers.

Looking now to FIG. 4 the sleeve 152 with the end of the associated drive cable 74 is slidably located on the upper circular opening 134 in side guide and track 42. The distance between slide plates 138 and 140 is selected such that lower slide plates 140 and 138 overengage track portion 131 when slide plate 140 is in slot 130. The reduced diameter portion 148 of pin 146 is located under the leaf spring 102 with the head 150 inhibiting sideways disengagement. In the normal position shown in FIG. 4, the leaf spring 102 exerts a force on the pin 146 tending to hold the support block 156 in its upright position. The support pin 168 is journelled in the pin support 104 with the vertical height of the pin 168 setting the height of the rear of the glass roof assembly 20 (the front height was set by front support assembly 100 as previously discussed). Note that support pin 168 can be disengaged from the pin support 104 by pulling the support block 156 away from the slide body 136 against the spring 162. In the position shown in FIG. 4, the glass roof assembly 20 is in its forward, raised, closed position. To open the roof assembly 20 the motor 56 is energized whereby the drive cable 74 is moved rearwardly in translation. Initially only the slide body 136 is moved rearwardly; as this occurs the support block 156 pivots forwardly (in direction of Arrow A, FIG. 10) dropping the rear edge of the glass roof assembly 20 permitting it to drop below the existing vehicle roof line. Upon further rearward movement, the glass roof assembly 20 is moved rearwardly to the open position shown in FIG. 3. Note that in the event the screen assembly 22 is closed when the motor 56 is actuated to open the glass roof assembly 20 the screen assembly 22 will automatically be carried to its open position via engagement with catch bracket 122.

To close the glass roof assembly 20 the motor 56 is actuated to reverse and pull the cable 74. The support block 156 will remain in its pivoted position until the roof assembly 20 is in the opening 16. At this time further tension on drive cable 74 will move the slide body 136 whereby the support block 156 will be pivoted to its upright position raising the rear edge of glass roof assembly 20 to its normal position.

Note that the drive cable 74 is guided in the upper opening 134 of the side guide and track 42 and extends to the drive gear 60 via curved guide section 44 and upper opening 180 (see FIG. 6) in front section 54. After passing through the area of drive gear 60 the drive cable 74 is guided through the curved section 52 and thence to the lower opening 132 in the opposite side guide and track 42. The cable 78 is similarly oppositely guided to the drive gear 60 extending through lower opening 182 in front section 54.

The construction of the slide members 136 and 136' out of one piece polycarbonate (eliminating the plastic insert) substantially improved the strength of those components such that they would not fail at higher vehicle impact speeds. In the same manner the side guide and tracks 40 and 42, curved sections 44, 46, 50 and 52, and front sections 48 and 54 are constructed of a relatively high strength aluminum alloy (e.g. SAE AA6063-TI) having a relatively high yield point (13,000 psi) and tensile strength (22,000 psi). The above combination substantially improved the ability of the roof construction to withstand higher vehicle impact loads.

While it will be apparent that the preferred embodiments of the invention disclosed are well calculated to fulfill the objects above stated, it will be appreciated that the invention is susceptible to modification, variation and change without departing from the proper scope or fair meaning of the invention.

What is claimed is:

1. In a vehicle having a roof with an opening therein, a sliding roof construction for selectively opening and closing the roof opening comprising: a glass roof assembly, a frame assembly, first support means for slidably supporting said glass roof assembly in said frame assembly for sliding said glass roof assembly to first positions opening or closing the roof opening, drive means operatively connected with said first support means and said frame assembly for selectively sliding said glass roof assembly to said first positions, said glass roof assembly comprising a glass panel, a molding located about said glass panel and having a groove for grippingly receiving said glass panel, a reinforcing frame receiving said glass panel and said molding, and fastening means securing said molding to said reinforcing frame whereby said glass panel is secured to said reinforcing frame, said molding having a leg depending from said groove, said reinforcing frame having a raised portion generally matching the shape of said molding, said depending leg extending about the side of said raised portion, said fastening means securing said depending leg to said side of said raised portion.

2. The sliding roof construction of claim 1 with said molding constructed of mild, deformable aluminum, said molding having a split defining two free ends whereby said molding can be opened at said free ends to facilitate assembly of said glass panel therein.

3. The sliding roof construction of claim 2 with said glass panel secured in said groove of said molding via an adhesive.

4. In a vehicle having a roof with an opening therein, a sliding roof construction for selectively opening and closing the roof opening comprising: a glass roof assembly, a screen assembly, a frame assembly, first support means for slidably supporting said glass roof assembly in said frame assembly for sliding said glass roof assembly to first positions opening or closing the roof opening, second support means slidably supporting said screen assembly in said frame assembly for sliding said screen assembly to second positions blocking or not blocking the roof opening, drive means operatively connected with said first support means and said frame assembly for selectively sliding said glass roof assembly to said first positions, said screen assembly comprising an opaque screen for blocking light passing through said glass roof assembly, said screen having an outer panel of a temperature stable material, said drive means operatively connected with said screen assembly for moving said screen assembly to its position out of said roof opening when said glass roof assembly is moved to its position out of said roof opening whereby said screen assembly can be located in said roof opening only when said glass roof assembly is located therein whereby said outer panel of said screen is made of a material and construction not adapted to exposure to the elements, said outer panel of said screen having a plurality of internally facing concave ribs, a stiff covering material secured to said outer panel and enclosing said ribs to provide a smooth internal surface.

5. The roof construction of claim 4 with said outer panel constructed of hardboard.

6. The roof construction of claim 5 with said stiff covering constructed of a heavy paper-like material.

7. In a vehicle having a roof with an opening therein, a sliding roof construction for selectively opening and closing the roof opening comprising: a glass roof assembly, a frame assembly, first support means for slidably supporting said roof assembly in said frame assembly for sliding said glass roof assembly to first positions opening or closing the roof opening, drive means operatively connected with said first support means and said frame assembly for selectively sliding said glass roof assembly to said first positions, said first support means comprising a pair of side guide and track members located on said frame assembly on opposite sides of the roof opening, each said side guide and track members having a longitudinally extending slot defining a track, a pair of rear support members slidably supported in said slot and secured to said glass roof assembly for supporting the rearward end of said glass roof assembly, each said rear support members having a one piece slide member having a pair of vertically spaced slide plates, one of said side plates located in said slot whereby said side plates overengage said track, said slide member being constructed of a plastic material having good lubricity characteristics whereby the need for a low friction insert between said side plates is obviated, said glass roof assembly comprising a glass panel, a split molding of deformable material located about said glass panel and having a groove for grippingly receiving said glass panel, a reinforcing frame receiving said glass panel and said molding and fastening means securing said molding to said reinforcing frame whereby said glass panel is secured to said reinforcing frame, said molding having a leg depending from said groove, said reinforcing frame having a raised portion generally matching the shape of said molding, said depending leg extending about the side of said raised portion, said fastening means securing said depending leg to said side of said raised portion, said molding constructed of mild, deformable aluminum, said glass panel secured in said groove of said molding via an adhesive.

8. The roof construction of claim 7 with said slide member being made of a polycarbonate, said drive means comprising a drive cable, one end of said drive cable fixed to said one of said side plates, each of said guide and track members constructed of a high strength aluminum alloy having a tensile strength of approximately 22,000 psi.

9. The sliding roof construction of claim 7 further comprising: a screen assembly, second support means slidably supporting said screen assembly in said frame assembly for sliding said screen assembly to second positions blocking or not blocking the roof opening, said frame assembly comprising a one piece stamped frame housing having a peripheral channel defining a gutter and having a rear panel closing its rearward, lower end and defining at its forward end a frame opening generally in line with said roof opening, said channel being integral with said rear panel and being of a preselected depth to house said glass roof assembly and said screen assembly in vertically spaced relationship.

10. The sliding roof construction of claim 8 further comprising: a screen assembly, second support means slidably supporting said screen assembly in said frame assembly for sliding said screen assembly to second positions blocking or not blocking the roof opening, said frame assembly comprising a one piece frame housing having a peripheral channel defining a gutter and having a rear panel closing its rearward, lower end and defining at its forward end a frame opening generally in line with said roof opening said channel being one piece with said rear panel and being of a preselected depth to house said glass roof assembly and said screen assembly in vertically spaced relationship.

* * * * *